US009968936B1

United States Patent
Fitzgerald (10) Patent No.: US 9,968,936 B1
(45) Date of Patent: *May 15, 2018

(54) SYSTEM AND METHOD FOR DRY MATERIAL FRACTIONATION USING ACCELERATORS

(71) Applicant: Shockwave ABF LLC, Des Moines, IA (US)

(72) Inventor: Joseph R. Fitzgerald, Pleasant Hill, IA (US)

(73) Assignee: Shockwave ABF LLC, Des Moines, IA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/936,051

(22) Filed: Nov. 9, 2015

Related U.S. Application Data (63) Continuation of application No. 14/684,915, filed on Apr. 13, 2015, now Pat. No. 9,180,463.

(60) Provisional application No. 62/043,509, filed on Aug. 29, 2014.

(51) Int. Cl.
| | |
|---|---|
| *B02B 3/12* | (2006.01) |
| *A01F 12/44* | (2006.01) |
| *B02B 5/02* | (2006.01) |
| *A01F 12/48* | (2006.01) |
| *B02C 19/06* | (2006.01) |
| *F26B 1/00* | (2006.01) |
| *B02C 23/08* | (2006.01) |

(52) U.S. Cl.
CPC ................ *B02B 3/12* (2013.01); *A01F 12/44* (2013.01); *A01F 12/48* (2013.01); *B02B 5/02* (2013.01); *B02C 19/06* (2013.01); *B02C 23/08* (2013.01); *F26B 1/005* (2013.01)

(58) Field of Classification Search
CPC ... B02B 3/12; B02B 5/02; A01F 12/44; A01F 12/48; B02C 19/06; B02C 23/08; B02C 23/10; F26B 1/005
See application file for complete search history.

(56) References Cited

U.S. PATENT DOCUMENTS

| | | | |
|---|---|---|---|
| 3,255,793 | A | 6/1966 | Clute |
| 3,658,259 | A | 4/1972 | Ledergerber |
| 3,897,010 | A | 7/1975 | Weishaupt et al. |
| 3,965,086 | A | 6/1976 | Swain et al. |

(Continued)

FOREIGN PATENT DOCUMENTS

| | | | |
|---|---|---|---|
| CN | 1868609 | * | 11/2006 |
| CN | 100374217 | | 3/2008 |

(Continued)

OTHER PUBLICATIONS

English Translation for CN 1868609 dated Nov. 29, 2006.*

(Continued)

*Primary Examiner* — Anthony Weier (57) ABSTRACT

A method includes introducing at least one of a whole product or a milled product (e.g., corn) to an airflow (e.g., using a gravity hopper), directing the airflow into one or more accelerators, separating a first fraction of the at least one of the whole product or the milled product from a second fraction of the at least one of the whole product or the milled product in the one or more accelerators. For example, corn germ, starch, and bran components can be separated from one another.

20 Claims, 8 Drawing Sheets

(56) References Cited

U.S. PATENT DOCUMENTS

| | | |
|---|---|---|
| 3,979,375 A | 9/1976 | Rao et al. |
| 4,189,503 A | 2/1980 | Giguere |
| 4,691,866 A | 9/1987 | Belk |
| 5,250,313 A | 10/1993 | Giguere |
| 5,562,253 A | 10/1996 | Henderson et al. |
| 5,598,979 A | 2/1997 | Rowley, Jr. |
| 5,628,464 A | 5/1997 | Smith et al. |
| 6,093,326 A | 7/2000 | Heikkila et al. |
| 6,187,204 B1 | 2/2001 | Heikkild et al. |
| 6,491,242 B1 | 12/2002 | Dingee, IV et al. |
| 6,588,686 B2 | 7/2003 | Dingee |
| 7,104,479 B1 | 9/2006 | Griebat et al. |
| 7,138,257 B2 | 11/2006 | Galli et al. |
| 7,189,306 B2 | 3/2007 | Gervais |
| 7,358,402 B2 | 4/2008 | Ueda et al. |
| 7,419,108 B2 | 9/2008 | Foster |
| 7,524,522 B2 | 4/2009 | DeLine et al. |
| 7,563,607 B2 | 7/2009 | Duan et al. |
| 7,569,671 B2 | 8/2009 | Cheryan |
| 7,625,961 B2 | 12/2009 | Riebel |
| 7,919,289 B2 | 4/2011 | Lewis |
| 7,938,345 B2 | 5/2011 | Teeter, Jr. et al. |
| 7,968,318 B2 | 6/2011 | Lantero et al. |
| 8,006,406 B2 | 8/2011 | Dingee, IV |
| 8,052,999 B2 | 11/2011 | Politi et al. |
| 8,075,694 B2 | 12/2011 | Duan et al. |
| 8,142,830 B2 | 3/2012 | Marentis |
| 8,227,012 B2 | 7/2012 | DeLine et al. |
| 8,344,107 B2 | 1/2013 | Cheryan |
| 8,344,108 B2 | 1/2013 | Cheryan |
| 8,409,640 B2 | 4/2013 | Lewis et al. |
| 8,449,728 B2 | 5/2013 | Redford |
| 8,506,956 B2 | 8/2013 | Ueda et al. |
| 8,551,553 B2 | 10/2013 | DeLine et al. |
| 8,557,318 B2 | 10/2013 | Marentis |
| 8,581,134 B2 | 11/2013 | Politi et al. |
| 9,180,463 B1 * | 11/2015 | Fitzgerald ................ B02B 3/12 |
| 2003/0104101 A1 | 6/2003 | Matthews et al. |
| 2003/0175384 A1 | 9/2003 | Bohm et al. |
| 2003/0232109 A1 | 12/2003 | Dawley et al. |
| 2004/0043088 A1 | 3/2004 | Endo et al. |
| 2005/0016525 A1 | 1/2005 | Thorre |
| 2011/0073689 A1 | 3/2011 | Paulat et al. |
| 2013/0186990 A1 | 7/2013 | Kato |
| 2015/0147311 A1 | 5/2015 | DeSilva et al. |

FOREIGN PATENT DOCUMENTS

| | | |
|---|---|---|
| CN | 103447138 | 12/2013 |
| EP | 1213054 | 6/2002 |
| JP | S-637850 A | 1/1988 |
| WO | WO-9212795 A1 | 8/1992 |
| WO | 03047366 | 6/2003 |
| WO | 03063609 | 8/2003 |
| WO | 03080775 | 10/2003 |
| WO | 2004093549 | 11/2004 |
| WO | WO-2008005097 A2 | 1/2008 |
| WO | 2009094418 | 7/2009 |

OTHER PUBLICATIONS

English Translation for CN103447138 dated Dec. 18, 2013.*
Notification of Transmittal of the International Search Report and the Written Opinion of the International Searching Authority—dated Dec. 10, 2015.
Extended European Search Report dated Mar. 21, 2018 corresponding to European Application No. 15835560.2; 8 pages.

* cited by examiner

SYSTEM AND METHOD FOR DRY MATERIAL FRACTIONATION USING ACCELERATORS

CROSS-REFERENCE TO RELATED APPLICATIONS

The present application is a continuation of U.S. application Ser. No. 14/684,915, filed Apr. 13, 2015, now U.S. Pat. No. 9,180,463, which claims the benefit under 35 U.S.C. § 119(e) of U.S. Provisional Application Ser. No. 62/043,509, filed Aug. 29, 2014, and titled "DRY MATERIAL FRACTIONATION USING ACCELERATORS," which is herein incorporated by reference in its entirety.

SUMMARY

A method includes introducing at least one of a whole product or a milled product (e.g., corn) to an airflow (e.g., using a gravity hopper), directing the airflow into one or more accelerators, separating a first fraction of the at least one of the whole product or the milled product from a second fraction of the at least one of the whole product or the milled product in the one or more accelerators. For example, corn germ, starch, and bran components can be separated from one another.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Corn is typically milled as a whole kernel. However there are other practices in both wet milling and dry milling corn that can isolate particular fractions of the corn for human food, animal feed, and fuel uses. The germ contains protein and fiber, the hard endosperm contains fiber and gluten, and the soft endosperm contains starch. For example, corn oil can be used in biodiesel applications, and a further refining process can be used for human consumption. Fiber can be used in animal and human foods, and starch can be used for fuel, food, feed, building materials etc. The present disclosure is directed to systems and techniques to fractionate a dry food product. For example, corn germ is removed from corn kernels, and starch and bran are classified by size and/or density. The systems and techniques described herein can facilitate the production of corn germ, starch, and bran components with a consistently high quality, generating valuable end products.

Referring generally to FIGS. 1 through 8B, systems 90 for receiving whole or milled product 100 (e.g., whole corn) and degerming the whole or milled product 100 are described. In some embodiments, the systems and techniques described herein can be used to process about twenty (20) tons per hour of whole or milled product 100. The systems 90 can include a hopper 96, a conveyor 98, and a gravity hopper 102 for receiving the whole or milled product 100. In some embodiments, the whole or milled product 100 can be milled before supplying the whole or milled product 100 to the gravity hopper 102. For example, when the whole or milled product 100 comprises corn (maize), the endosperm of the corn can be scored prior to supplying the corn to the gravity hopper 102. In other embodiments, the whole or milled product 100 is not necessarily milled before supplying the whole or milled product 100 to the gravity hopper 102.

Figure 1:
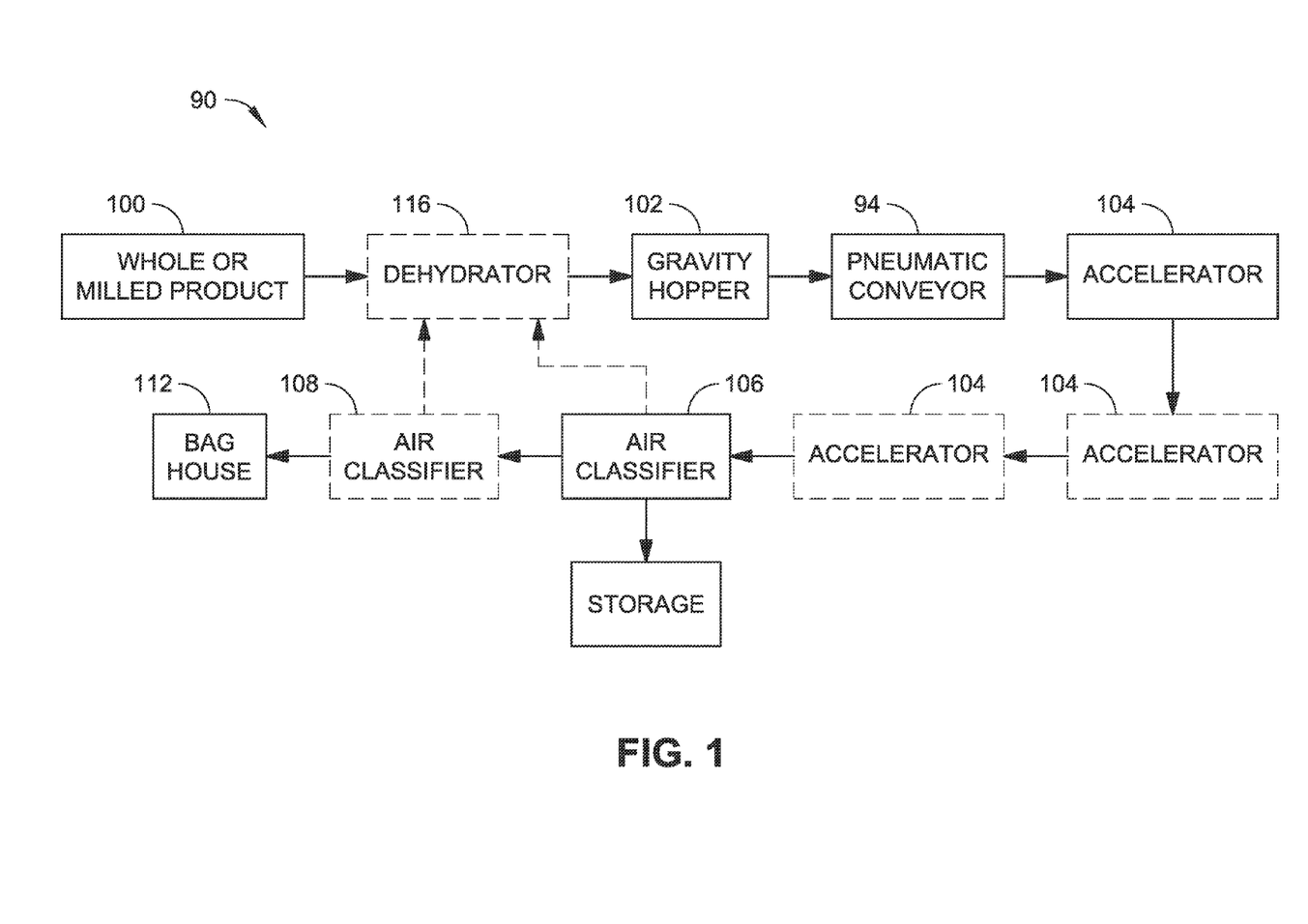
FIG. 1 is a block diagram illustrating a pneumatic conveyor system in accordance with example embodiments of the present disclosure.
Figure 2:
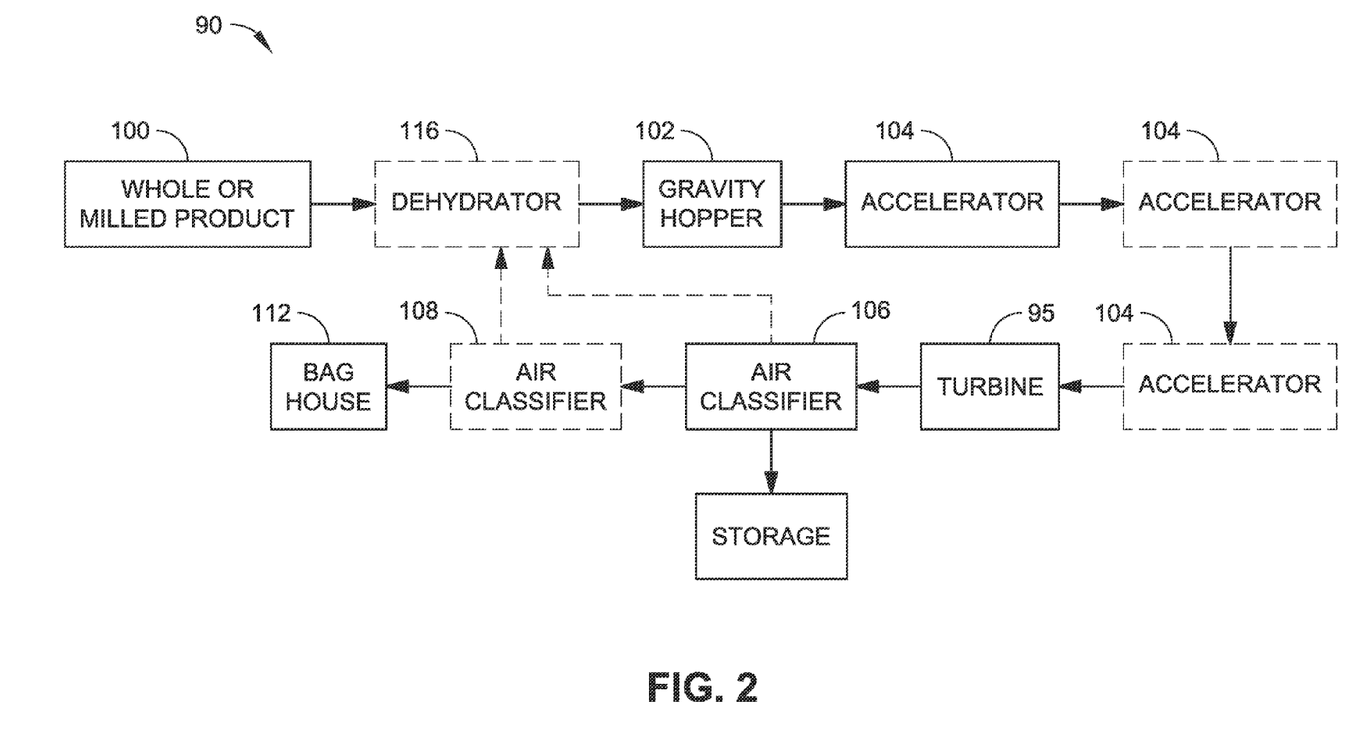
FIG. 2 is a block diagram illustrating a turbine system in accordance with example embodiments of the present disclosure.
Figure 3A:
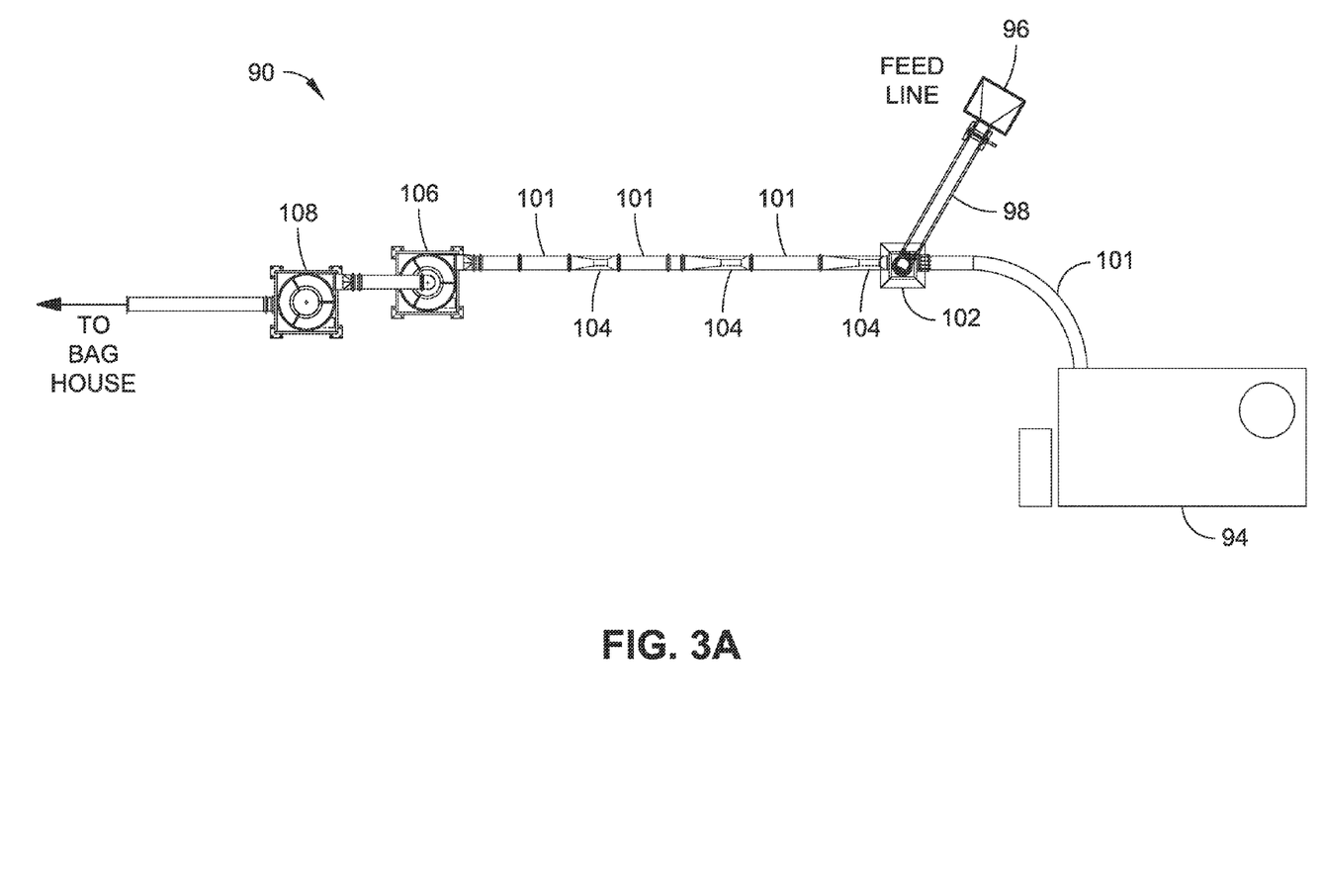
FIG. 3A is a top plan view illustrating a pneumatic conveyor system, such as the pneumatic conveyor system illustrated in FIG. 1, in accordance with an example embodiment of the present disclosure.
Figure 3B:
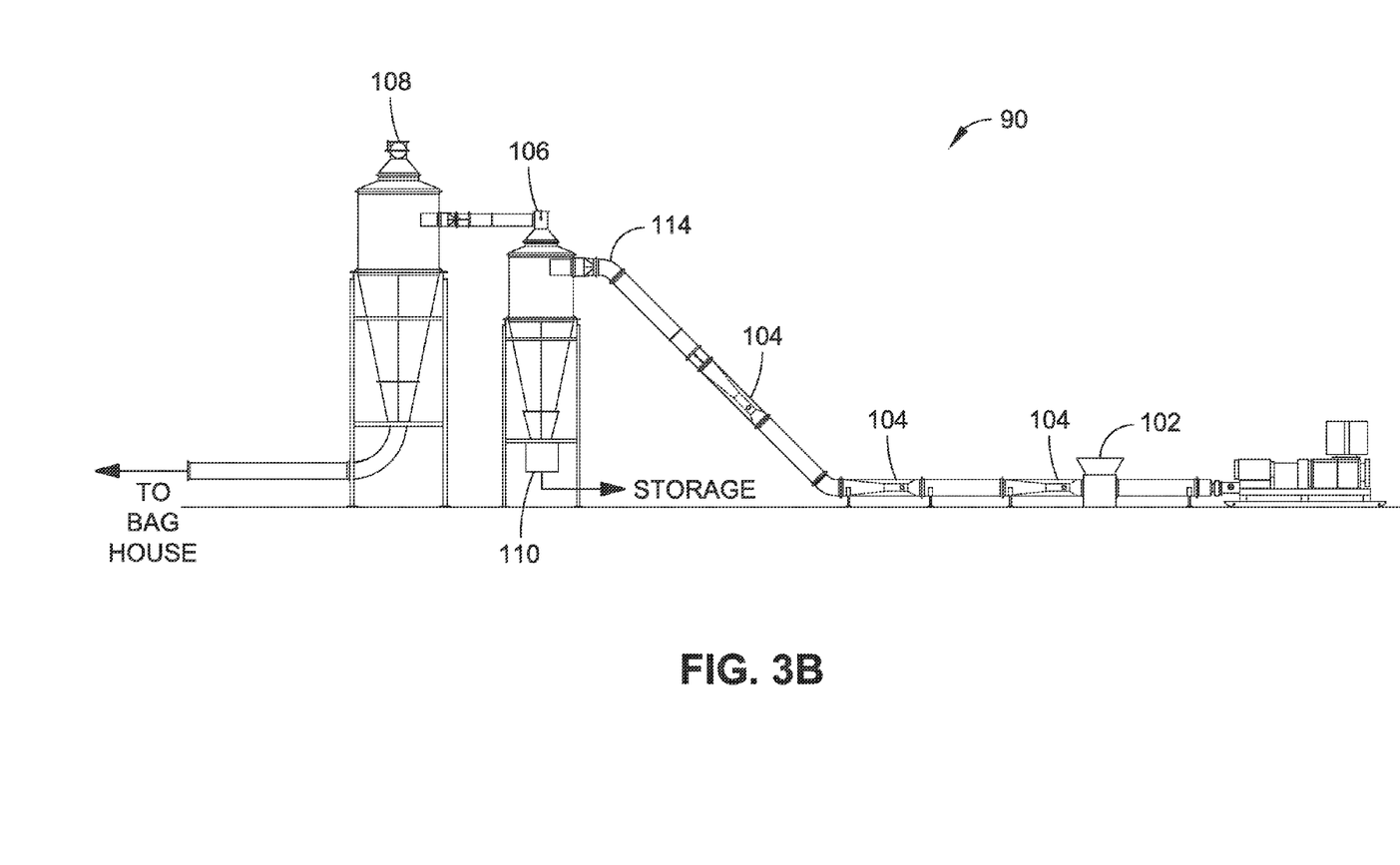
FIG. 3B is a side elevation view of the pneumatic conveyor system illustrated in FIG. 3A.
Figure 4A:
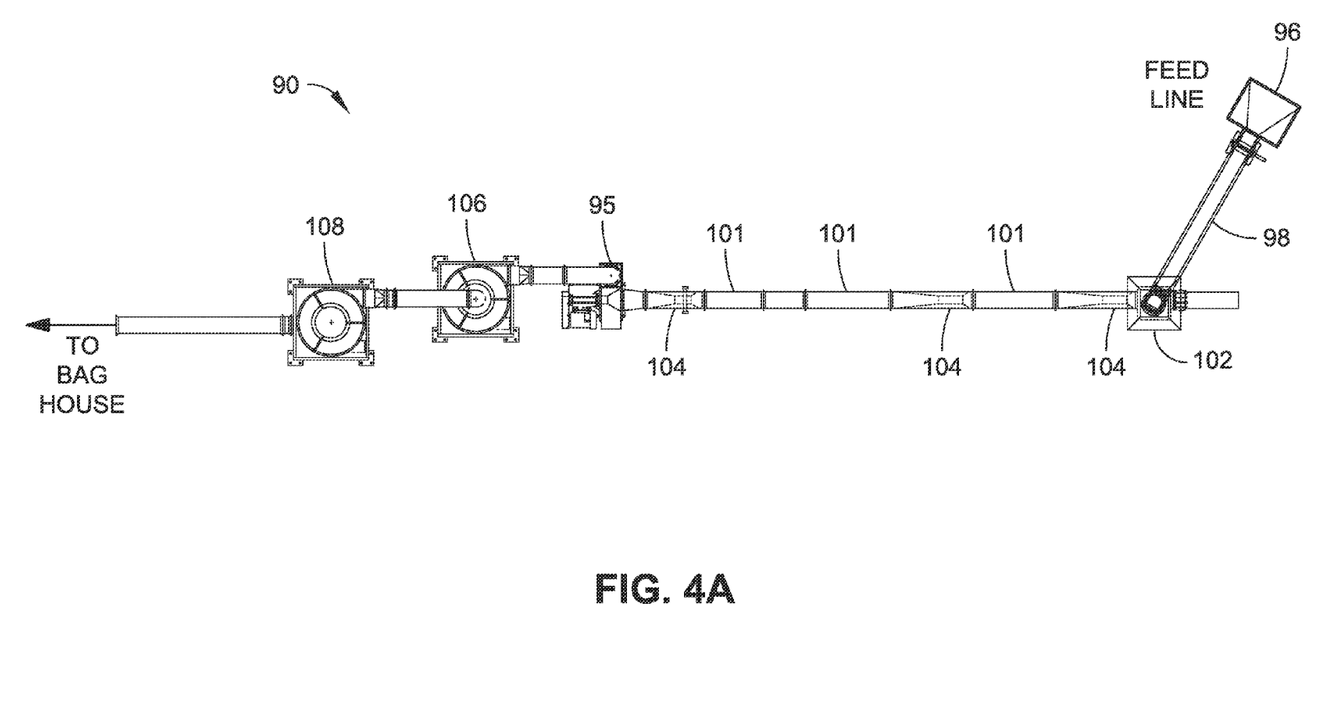
FIG. 4A is a top plan view illustrating a turbine system, such as the turbine system illustrated FIG. 2, in accordance with an example embodiment of the present disclosure.
Figure 4B:
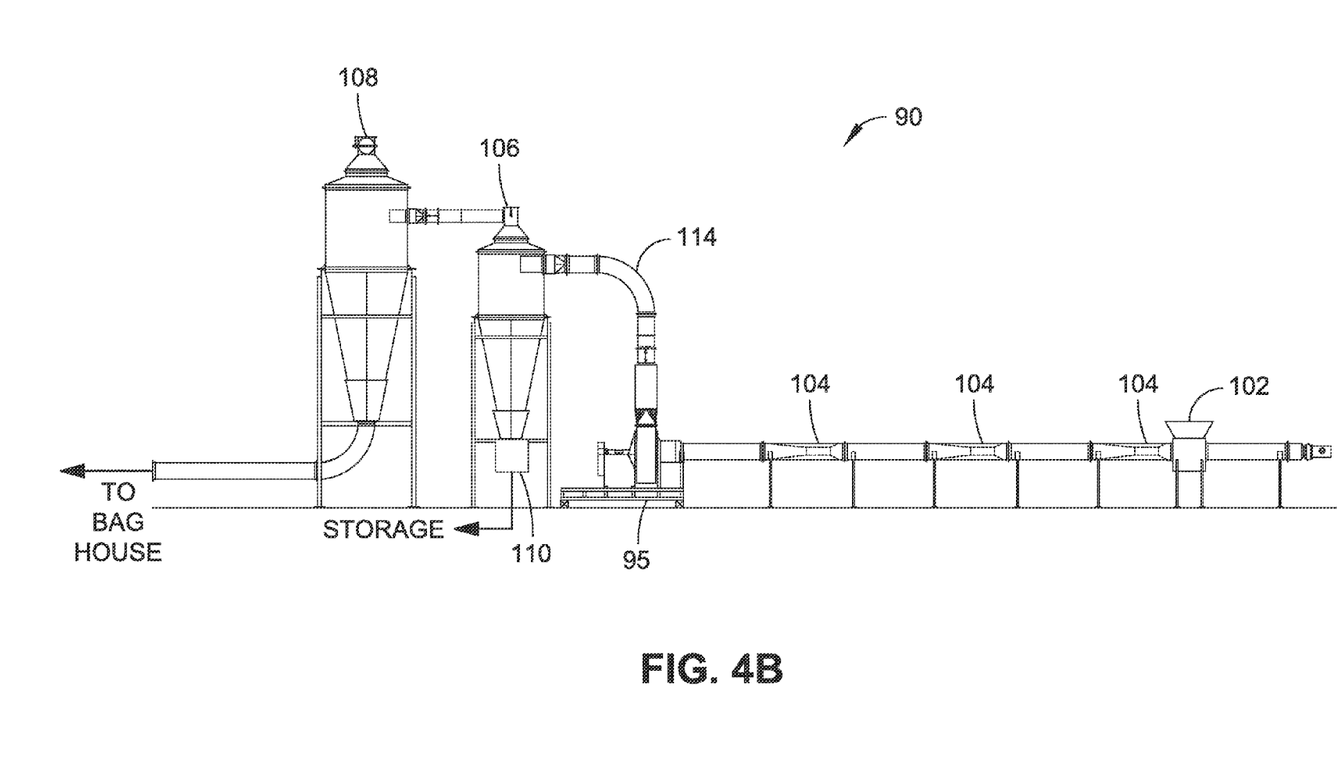
FIG. 4B is a side elevation view of the turbine system illustrated in FIG. 4A.

Next, gravity acts on the whole or milled product 100 in the gravity hopper 102, and the whole or milled product 100 enters an airflow generated by a blower, a turbine fan, and/or another airflow generating device. For example, the gravity hopper 102 is coupled with a pneumatic conveyor 94, and the whole or milled product 100 enters a dynamic airflow generated by the pneumatic conveyor 94 (e.g., as shown in FIGS. 1, 3A, and 3B). In some embodiments, a blower of the pneumatic conveyor 94 can be operated at between at least approximately three thousand pounds per square inch (3,000 psi) and five thousand pounds per square inch (5,000 psi), e.g., at about three thousand five hundred pounds per square inch (3,500 psi). However, the pneumatic conveyor 94 is provided by way of example only and is not meant to limit the present disclosure. In other embodiments, the whole or milled product 100 can enter a dynamic airflow generated by a turbine 95 (e.g., as shown in FIGS. 2, 4A, and 4B). In some embodiments, the turbine 95 can be operated at between at least approximately three thousand five hundred pounds per square inch (3,500 psi) and four thousand pounds per square inch (4,000 psi). Once in the airflow, forces on the product can include, but are not necessarily limited to: impact forces, vibrational forces, centrifugal forces, turbulent forces, laminar stress forces, combinations thereof, and so forth.

Figure 5:
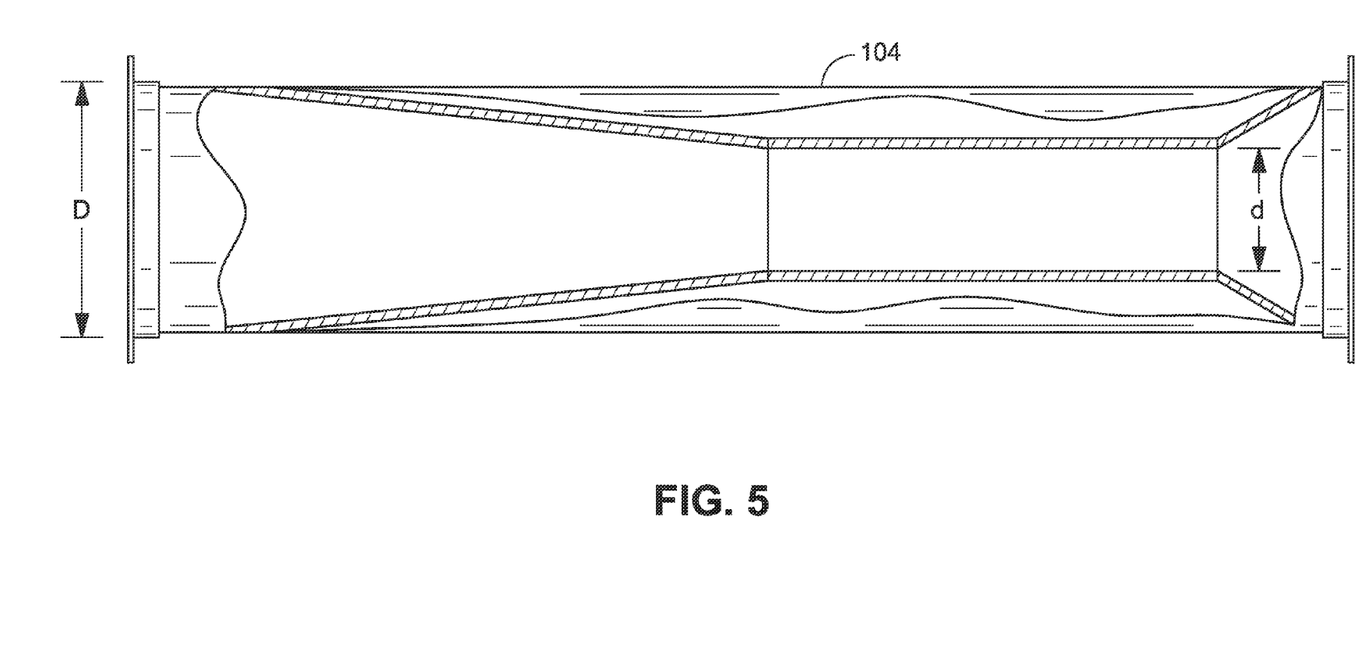
FIG. 5 is a cross-sectional side elevation view of an accelerator for a pneumatic conveyor system and/or a turbine system, such as the pneumatic conveyor system and/or the turbine system illustrated in FIGS. 1 through 4B, in accordance with an example embodiment of the present disclosure.

Then, the airflow including the whole or milled product 100 is directed into one or more accelerators 104. In embodiments of the disclosure, airflow in an accelerator 104 is reduced, and pressure is increased as the whole or milled product 100 passes through the accelerator 104. For example, an ingress diameter D of an accelerator 104 can be at least approximately twice an egress diameter d of the accelerator 104 (e.g., as shown in FIG. 5). In this manner, the forces on the whole or milled product 100 in the airflow can fractionate the whole or milled product 100. For example, in the case of a milled corn product, germ can be separated from hard and/or soft endosperm. However, this relationship between the ingress diameter and the egress diameter is provided by way of example and is not meant to limit the present disclosure. In other embodiments, a relationship between an ingress diameter and an egress diameter of an accelerator can be less than two-to-one, greater than two-to-one, and so forth.

In some embodiments, more than one accelerator 104 is used to fractionate the whole or milled product 100 (e.g., until the bran is free, or at least substantially free, of bonded starch and/or the germ is free of starch and bran, in the case of a corn product). For example, a second accelerator 104 can be used (and possibly a third accelerator 104, a fourth accelerator 104, and so on). In some embodiments, three accelerators 104 are used. Multiple accelerators 104 can be connected together using, for example ducts 101. It should be noted that in some embodiments, a number of accelerators 104 can be selected to provide a desired particle size (e.g., for starch produced by the system 90). For example, more accelerators can be added to a system 90 to produce starch having a smaller particle size.

Next, the fractions of the whole or milled product 100 are separated from one another (e.g., germ and bran are separated from starch, in the case of a corn product). For example, air classification is used to separate fractions of the whole or milled product 100. In some embodiments, a first air classifier 106 (e.g., a cyclone, a cyclonic air classifier) can be used to separate components of the whole or milled product 100 from one another, and an airlock (e.g., a rotary airlock 110) can be used to direct the separated material out of the airstream. For example, in the case of a milled corn product, germ and/or bran fractions are separated from a starch fraction by the first air classifier 106, exit the airstream via the rotary airlock 110, and are directed to storage (e.g., as shown in FIGS. 1 through 4). In some embodiments, a second air classifier 108 (e.g., a cyclone, a cyclonic air classifier) can be used to air classify a separated fraction of the whole or milled product 100. For example, in the case of a milled corn product, starch is air classified with the second air classifier 108. However, it should be noted that two air classifiers are provided by way of example and are not meant to limit the present disclosure. In other embodiments more than two air classifiers can be used in a system 90. In some embodiments, one or more air classifiers (e.g., air classifier 106 and/or 108) can be connected to the system 90 using, for example, duct elbows 114.

Then, dust particles (e.g., particles of bran and/or starch, in the case of a corn product) can be captured by a dust collecting bag house 112. Examples of such bag houses 112 include, but are not necessarily limited to, bag houses manufactured by: DONALDSON, TORET, and/or MAC. In some embodiments, a screen size of plus three and one-quarter (+3.25) mesh can be used to separate out large bran and/or germ, a screen size of plus twenty (+20) can be used to separate out bran and/or small germ, and a screen size of minus twenty (−20) can be used to separate out starch flour. In some embodiments, further screening using a gravity table can be used to separate germ from bran (e.g., by density). Examples of such gravity tables include, but are not necessarily limited to, gravity tables manufactured by: PEGASUS, RUIXE, and FORSBERG. However, air classifiers and gravity tables are provided by way of example only and are not meant to limit the present disclosure. In other embodiments, one or more other separating devices can be used, such as a deck screener.

In some embodiments, separation of germ, bran, and starch is obtained using airflow speeds in a system 90 between at least approximately three hundred and five miles per hour (305 mph) and four hundred miles per hour (400 mph) (e.g., in an eight-inch (8") pipe, such as a duct 101). In this configuration, the temperature in the system 90 can be warmer then the whole or milled product 100 (e.g., corn) supplied to the system 90. In some embodiments, the airflow in the system 90 can be maintained at a temperature of between at least approximately one hundred and twenty degrees Fahrenheit (120° F.) and one hundred and fifty degrees Fahrenheit (150° F.). However, this temperature range is provided by way of example and is not meant to limit the present disclosure. In other embodiments, temperatures within a system 90 can be maintained at less than one hundred and twenty degrees Fahrenheit (120° F.), more than one hundred and fifty degrees Fahrenheit (150° F.), and so forth. For instance, in some embodiments, temperatures within a system 90 can be maintained at or above at least approximately one hundred and seventy-six degrees Fahrenheit (176° F.). Further, it should be noted that such elevated temperatures may allow products produced using a system 90 to be employed as feed and/or food ingredients, and so forth.

In some embodiments, the whole or milled product 100 (e.g., corn) can be supplied to a system 90 at between at least approximately thirteen percent (13%) and eighteen percent (18%) moisture (e.g., between at least approximately fifteen percent (15%) and seventeen percent (17%) moisture). In some embodiments, the temperature of the whole or milled product 100 (e.g., corn) supplied to a system 90 can be above at least approximately fifty-five degrees Fahrenheit (55° F.) (e.g., between at least approximately eighty degrees Fahrenheit (80° F.) and ninety degrees Fahrenheit (90° F.)). However, these temperatures are provided by way of example and are not meant to limit the present disclosure. In other embodiments, the whole or milled product 100 can be supplied at a temperature less than fifty-five degrees Fahrenheit (55° F.), greater than ninety degrees Fahrenheit (90° F.), and so forth.

It should be noted that adjusting the airflow speed in the system 90 can warm the air (e.g., by increasing the airflow) or cool the airflow (e.g., by decreasing the airflow). In some embodiments, product exiting the system 90 is at a temperature less than the air temperature in the system 90. When this is not the case, the germ may have yield loss and the particle size of the starch may be smaller than desired. For example, at a system temperature of one hundred and seventy-six degrees Fahrenheit (176° F.), product exiting the system 90 may have a temperature of about one hundred and twenty degrees Fahrenheit (120° F.). The systems and techniques discussed herein can be implemented using computer control (e.g., automatically adjusting one or more settings of the system 90) to maintain desired (e.g., consistent) temperatures. Further, such settings can be adjusted with respect to outside air temperature (e.g., seasonally).

In some embodiments, when the whole or milled product 100 (e.g., corn) is above a particular moisture level, an additional source of heat can be used to dry the whole or milled product 100 (e.g., before it is supplied to the gravity hopper 102). For example, one or more heat sources (e.g., dehydrators 116) can be added at an ingress to a system 90 (e.g., to dry corn prior to inserting the corn into airflow in the system 90). However, this configuration is provided by way of example and is not meant to limit the present disclosure.

In other embodiments, one or more dehydrators 116 can be used in-line in a system 90 (e.g., upstream of an accelerator 104, downstream of an accelerator 104, between one or more accelerators 104, and so forth). In some embodiments, corn received at a moisture level of about thirty percent (30%) or higher can be dried to a moisture level of between at least approximately thirteen percent (13%) and eighteen percent (18%) (e.g., between at least approximately fifteen percent (15%) and seventeen percent (17%) moisture) before introducing the corn to the accelerators 104. In some embodiments, a dehydrator 116 can be implemented using a heat source that includes, but is not necessarily limited to: a natural gas furnace, a coal-fired furnace, an auxiliary heat source (e.g., using a squid line transitioning from a ten inch (10 in.) pipe to a two inch (2 in.) pipe), and so forth. Further, in some embodiments, products generated by a system 90 can be used as fuel for one or more dehydrators 116. For example, with reference to FIGS. 1 and 2, processed material (e.g., dust) sorted by air classification (e.g., by air classifier 106 and/or air classifier 108) can be used as fuel for a dehydrator 116 (e.g., in the manner of a closed loop system).

It should be noted that the germ may retain more moisture than the bran or starch. A visual and or touch/pinch examination of the germ product can allow a determination as to whether the appropriate settings have been reached. For example, in the case of a corn product, desired settings may be achieved when the germ remains gummy, the bran is comparatively hard, and the starch has a flour-like appearance. In some embodiments, dry corn material can be separated into fractions comprising at least approximately ten percent (10%) germ, forty percent (40%) bran and/or grit (e.g., bran product and bran with bonded starch mix), and fifty percent (50%) starch. However, these percentages are provided by way of example and are not meant to limit the present disclosure. In other embodiments, dry corn and/or other material can be separated into different fractional percentages.

Figure 6:
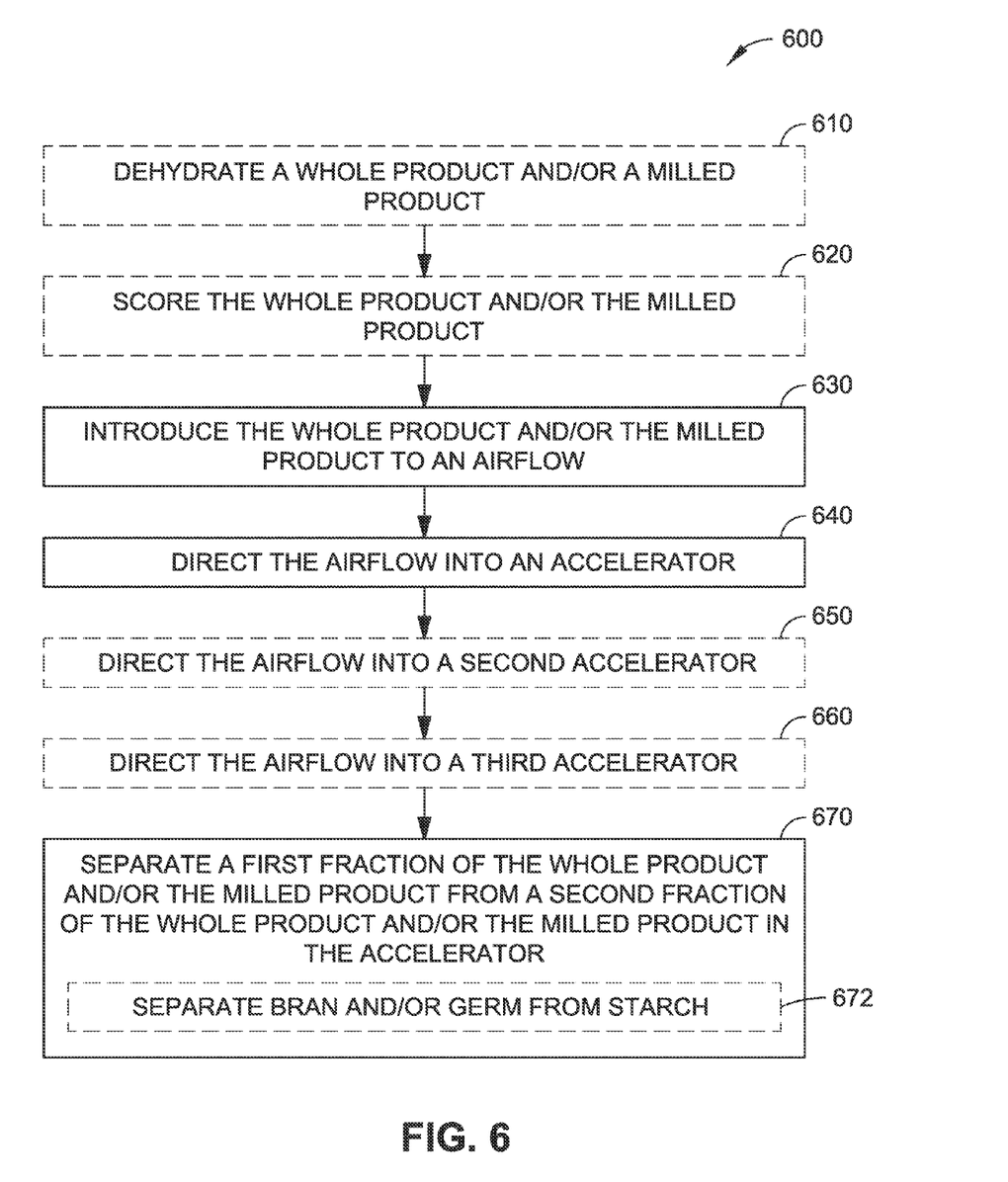
FIG. 6 is a flow diagram illustrating a method for receiving whole or milled product and degerming the whole or milled product in accordance with example embodiments of the present disclosure.

The following discussion describes example techniques for receiving whole and/or milled product and degerming the whole and/or milled product. FIG. 6 depicts a procedure 600, in example embodiments, in which whole and/or milled material, such as corn material, can be separated into fractions (e.g., germ, bran and/or grit, starch, etc.). In the procedure 600 illustrated, whole and/or milled product is received. In some embodiments, the whole and/or milled product can be dehydrated (Block 610). For example, with reference to FIGS. 1 and 2, dehydrator 116 can be used to dry corn received at a moisture level of about thirty percent (30%) or higher to a moisture level of between at least approximately thirteen percent (13%) and eighteen percent (18%). In some embodiments, the whole and/or milled product can also be scored (Block 620).

The whole and/or milled product is introduced to an airflow (Block 630). For example, with reference to FIGS. 1 through 4B, product fed to gravity hopper 102 enters a dynamic airflow generated by pneumatic conveyor 94 and/or turbine 95. Next, the airflow is directed into an accelerator (Block 640). In some embodiments, a second accelerator and possibly a third accelerator can also be used (Blocks 650 and 660). In the accelerator(s), a first fraction of the whole and/or milled product is separated from a second fraction of the whole and/or milled product (Block 670). For example, with reference to FIGS. 1 through 5, one or more accelerators 104 are used to separate a first fraction of whole or milled product 100 from a second fraction of whole or milled product 100 in accelerators 104. In some embodiments, bran and/or germ is separated from starch (Block 672). For example, corn material is separated into fractions comprising at least approximately ten percent (10%) germ, forty percent (40%) bran and/or grit (e.g., bran product and bran with bonded starch mix), and fifty percent (50%) starch.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method comprising:
    introducing a milled product to an airflow, the milled product having a moisture content ranging between thirteen percent (13%) and eighteen percent (18%);
    directing the airflow including the milled product into an accelerator, the accelerator comprising an ingress diameter and an egress diameter, wherein the ingress diameter is larger than the egress diameter; and
    degerming a first fraction of the milled product from a second fraction of the milled product in the accelerator.

2. The method as recited in claim 1, wherein the first fraction comprises at least one of bran or germ, and the second fraction comprises starch.

3. The method as recited in claim 1, wherein the milled product comprises a scored milled product.

4. The method as recited in claim 1, further comprising directing the airflow including the milled product into a second accelerator.

5. The method as recited in claim 4, further comprising directing the airflow including the milled product into a third accelerator.

6. The method as recited in claim 1, wherein degerming the first fraction from the second fraction comprises using an air classifier to separate the first fraction from the second fraction.

7. The method as recited in claim 6, wherein the air classifier comprises a cyclonic air classifier.

8. The method as recited in claim 1, further comprising dehydrating the milled product before directing the at least one of the whole product or the milled product into the accelerator.

9. A system comprising:
    an air mover for generating an airflow having a speed between three hundred and five miles per hour (305 mph) and four hundred miles per hour (400 mph) to maintain the airflow at a temperature above one hundred and twenty degrees Fahrenheit (120° F.), the airflow comprising a milled product, wherein the air mover is operated between at least three thousand pounds per square inch (3,000 psi) and five thousand pounds per square inch (5,000 psi); and
    an accelerator for receiving the airflow including the milled product and degerming a first fraction of the milled product from a second fraction of the milled product, the milled product having a moisture content ranging between thirteen percent (13%) and eighteen percent (18%), the accelerator comprising an ingress diameter and an egress diameter, wherein the ingress diameter is larger than the egress diameter.

10. The system as recited in claim 9, wherein the milled product comprises corn.

11. The system as recited in claim 10, wherein the first fraction comprises at least one of bran or germ, and the second fraction comprises starch.

12. The system as recited in claim 9, further comprising a second accelerator for receiving the airflow including the milled product.

13. The system as recited in claim 12, further comprising a third accelerator for receiving the airflow including the milled product.

14. The system as recited in claim 9, further comprising an air classifier for separating the first fraction from the second fraction.

15. The system as recited in claim 14, wherein the air classifier comprises a cyclonic air classifier.

16. The system as recited in claim 9, further comprising a dehydrator for dehydrating the milled product before directing the milled product into the accelerator.

17. A method comprising:
dehydrating a milled product such that the milled product has a moisture content ranging between thirteen percent (13%) and eighteen percent (18%);
introducing the milled product to an airflow generated by an air mover, wherein the air mover is operated between at least three thousand five hundred pounds per square inch (3,500 psi) and four thousand pounds per square inch (4,000 psi);
directing the airflow including the milled product into an accelerator, the accelerator comprising an ingress diameter and an egress diameter, wherein the ingress diameter is larger than the egress diameter;
maintaining the airflow at a temperature above one hundred and twenty degrees Fahrenheit (120° F.); and
degerming a first fraction of the milled product from a second fraction of the milled product in the accelerator.

18. The method as recited in claim 17, wherein degerming the first fraction from the second fraction comprises using an air classifier to separate the first fraction from the second fraction.

19. The method as recited in claim 18, further comprising fueling a dehydrator for dehydrating the milled product using at least one of the first fraction or the second fraction separated by the air classifier.

20. The system of claim 9, wherein the accelerator comprises at least one of a pneumatic conveyor or a turbine.

* * * * *